United States Patent [19]

Loveless et al.

[11] Patent Number: 5,484,866

[45] Date of Patent: Jan. 16, 1996

[54] CONCENTRATES OF A HIGHLY BRANCHED POLYMER AND FUNCTIONAL FLUIDS PREPARED THEREFROM

[75] Inventors: Frederick C. Loveless; Wan-Li Liu, both of Yardley, Pa.

[73] Assignee: Mobil Oil Corporation, Fairfax, Va.

[21] Appl. No.: 149,449

[22] Filed: Nov. 9, 1993

[51] Int. Cl.[6] .................... C08F 236/00; C08F 212/06
[52] U.S. Cl. ................ 526/340; 526/347; 526/347.1; 525/333.3; 208/18
[58] Field of Search ................... 526/340, 347, 526/347.1

[56] References Cited

U.S. PATENT DOCUMENTS

| | | | |
|---|---|---|---|
| 3,318,813 | 5/1967 | McCormick et al. | 252/59 |
| 3,752,790 | 8/1973 | Bacakal | 260/88.1 |
| 3,752,794 | 8/1973 | Bacakal | 526/264 |
| 3,840,549 | 10/1974 | Heilweil et al. | 252/33.6 |
| 3,985,830 | 10/1976 | Fetters et al. | 260/880 B |
| 4,611,031 | 9/1986 | Galluccio et al. | 525/310 |

FOREIGN PATENT DOCUMENTS

| | | |
|---|---|---|
| 0220697 | 5/1987 | European Pat. Off. . |
| 0294161 | 12/1988 | European Pat. Off. . |
| 1565655 | 5/1969 | France . |
| 1224749 | 3/1971 | United Kingdom . |

*Primary Examiner*—Nathan M. Nutter
*Assistant Examiner*—Richard Jones
*Attorney, Agent, or Firm*—A. J. McKillop; M. D. Keen

[57] ABSTRACT

A process for the preparation of a polymer concentrate which is a relatively concentrated solution in a base stock oil, e.g., a mineral oil or synthetic hydrocarbon oil, of a highly branched polymer having segments of a polymer of p-tert-butylstyrene (t-BS), comprising the free radical solution polymerization in the base stock oil of t-BS and optionally, one or more additional polymerizable monoethylenically unsaturated (monofunctional) monomers together with a small amount of a multiethylenically unsaturated (multifunctional) cross-linking agent, e.g., divinylbenzene (DVB). Optionally, the polymer solution obtained from the polymerization may be diluted with an additional amount of the base stock oil employed in the polymerization to obtain a polymer concentrate having a lower polymer concentration and viscosity than the polymerization solution. The polymer concentrate may then be mixed with an additional a amount of base stock oil which may be the same or different from the base stock oil present in the polymer concentrate to obtain a functional fluid, e.g., a lubricating oil, having improved viscometric properties.

33 Claims, 1 Drawing Sheet

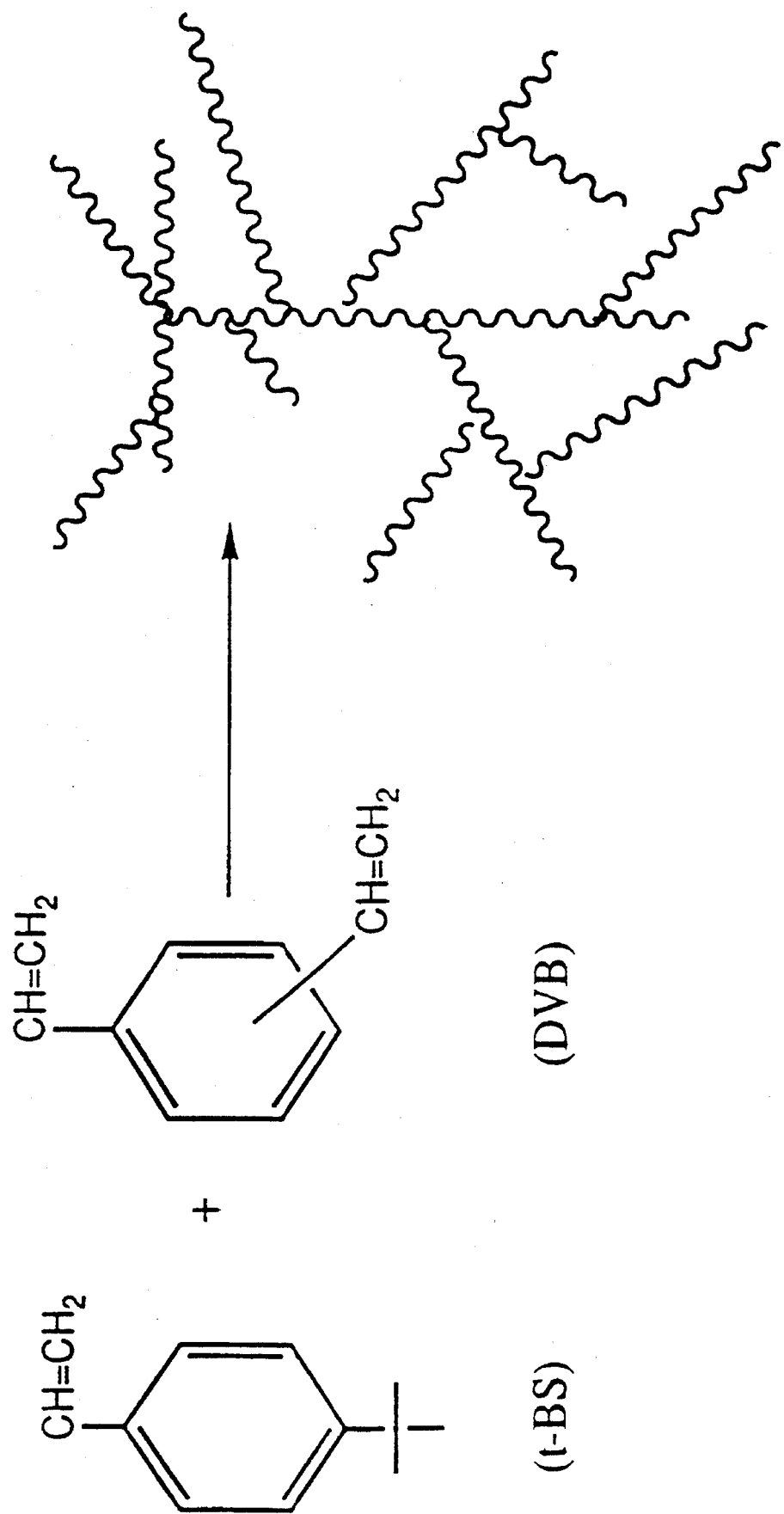

CONCENTRATES OF A HIGHLY BRANCHED POLYMER AND FUNCTIONAL FLUIDS PREPARED THEREFROM

BACKGROUND OF THE INVENTION

1. Field of the Invention

This invention relates to novel concentrates of a highly branched polymer and functional fluids, e.g., lubricating oils, prepared from such concentrates. The polymer acts as a viscosity index improver and thickener for the functional fluid.

2. Information Disclosure Statement Including Description of Related Art

The following information is being disclosed under the provisions of 37 CFR 1.56, 1.97 and 1.98.

Functional fluids such as lubricating oils often contain a dissolved polymer for the purpose of improving their viscosity index (VI) and/or thickness. In general, various types of straight chain homopolymers and random and graft copolymers used as functional fluid additives may be prepared by anionic or free radical polymerization, while star-branched copolymers are usually prepared by anionic polymerization. In many instances of polymers prepared from hydrocarbon monomers, the polymer is separated by coagulating from an emulsion polymerization medium or precipitating from a solution polymerization medium and, after subjecting the polymer to any of various purification steps, mixing the solid polymer with a small amount of a base stock oil to form a concentrate. In other instances, the concentrate is formed by carrying out the polymerization in a volatile organic solvent such as hexane, adding oil to the resulting polymer solution, and evaporating the volatile solvent. In either case, the final functional fluid is formed by mixing the concentrate with an additional amount of base stock oil, which may be the same or different from the base stock oil in which the polymer is dissolved to form the concentrate.

The mixing of a polymer concentrate rather than solid polymer with the final amount of base stock oil to form the functional fluid facilitates mixing and results in a more homogeneous functional fluid. However, the mixing of solid polymer with the initial base stock oil to form the concentrate may be a difficult and expensive procedure, particularly when the polymer is highly branched and may not produce a concentrate or final functional fluid having the desired degree of homogeneity. On the other hand, the process of preparing the concentrate by carrying out the polymerization in a volatile organic solvent, adding base stock oil, and evaporating the solvent, includes the necessity of handling the solvent consistent with environmental requirements, and using equipment and energy to evaporate and recover the solvent, which could also involve substantial expense. Thus, any process of preparing a polymer concentrate and a functional fluid containing a highly branched polymer additive which raises substantially the viscosity index and thickness of the functional fluid, while avoiding the necessity of dissolving the solid polymer in a base stock oil, or of adding the oil to a solution of the polymer in a volatile organic solvent which must then be evaporated, is very desirable.

The following prior art references show aspects of the use of polymers as viscosity index improvers in functional fluids, and the preparation of branched polymers from monofunctional monomers such as styrene and multifunctional cross-linking agents such as divinylbenzene.

U.S. Pat. No. 3,318813, issued May 9, 1967 to McCormick et al., discloses polymers of alkylstyrenes, e.g., tert-butylstyrene, as additives for improving the viscosity index of lubricating oils. There is no suggestion in this patent of the production or use of any highly branched polymers.

U.S. Pat. No. 3,752,794, issued Aug. 14, 1973 to Bacakal, discloses copolymers of p-tert-butylstyrene with a nitrogen-containing comonomer prepared by free-radical polymerization, used as viscosity index improving dispersants in lubricating oils. There is no suggestion in this patent of any highly branched polymers.

U.S. Pat. No. 3,985,830, issued Oct. 12, 1976 to Fetters, teaches star-branched polymers produced by anionic polymerization and containing at least three arms of a copolymer of butadiene and styrene or isoprene and styrene, or a homopolymer of butadiene, isoprene, styrene radiating from a nucleus composed of at least two molecules of a linking compound such as divinylbenzene (DVB). There is no suggestion in this patent of the preparation of a highly branched polymer having segments of a polymer of p-tert-butylstyrene (t-BS) by free radical polymerization, in situ polymerization in a base stock oil, or use of the polymer as a viscosity index improver.

U.S. Pat. No. 4,611,031, issued Sep. 9, 1986 to Gallucio et al., discloses the preparation of compatibilizers for blends of an olefin copolymer and a polymethacrylate polymer, useful as lubricating oil additives, by a free-radical initiated graft polymerization of alkyl methacrylate monomers onto a separately prepared olefin copolymer in a base stock oil as solvent. Additional quantities of olefin copolymer, polymethacrylate polymer, and base oil stock may be added to the compatilizer solution to obtain a finished lubricating oil. There is no suggestion in this patent of the in situ preparation of any solution in a base stock oil of a highly branched polymer containing segments of a polymer of p-tert-butylstyrene, for use as a lubricating oil or other functional fluid.

SUMMARY OF THE INVENTION

In accordance with this invention, a relatively concentrated solution in a base stock oil of a highly branched polymer having segments of a polymer of p-tert-butylstyrene (t-BS), hereinafter referred to as a "polymer concentrate", is prepared by the free-radical solution polymerization in the base stock oil as solvent of t-BS and optionally, one or more additional polymerizable monoethylenically unsaturated (monofunctional) monomers, together with a small amount of a multiethylenically unsaturated (multifunctional) cross-linking agent, e.g., divinylbenzene (DVB). The polymer solution thus obtained from the polymerization may in some instances serve as the concentrate of this invention but more often is somewhat diluted with an additional amount of the same base stock oil as that used in the polymerization to obtain a less viscous and more easily handled polymer concentrate. A functional fluid, e.g., lubricating oil, containing the highly branched polymer as viscosity index improver and thickener may then be prepared by mixing the polymer concentrate with additional base stock oil, which may be the same or different from the base stock oil present in the concentrate.

The foregoing method avoids the necessity of preparing the polymer concentrate by separately mixing the solid polymer and the base stock oil, which could be very difficult in the case of a highly branched polymer. Such method thus provides a practical means of preparing a functional fluid containing a highly branched polymer as viscosity index improver and thickener, such highly branched polymer generally providing a considerably higher relative thickening power (RTP) than a straight chain polymer similarly prepared but containing no branching agent.

BRIEF DESCRIPTION OF THE DRAWING

The drawing shows a schematic representation of the preparation in accordance with this invention of a highly branched polymer with segments of a p-tert-butylstyrene (t-BS) polymer cross-linked with divinylbenzene (DVB) by free radical solution polymerization of the monomers in a base stock oil suitable as a solvent for the polymer in a polymer concentrate. The product of the polymerization is a polymer concentrate, i.e., the base stock oil containing dissolved therein a relatively large amount of the highly branched polymer having a structure as illustrated in the drawing, such polymer being useful as a viscosity index improver and thickener in a subsequently prepared functional fluid.

DETAILED DESCRIPTION OF THE INVENTION

The monoethylenically unsaturated, i.e., monofunctional component of the monomeric mixture utilized to form the highly branched polymer of this invention may consist entirely of t-BS or may comprise t-BS and one or more monofunctional comonomers. The comonomer, if used, may be a hydrocarbon such as another vinyl aryl compound, e.g. styrene, another ring substituted alkylstyrene wherein the alkyl group is bonded to a ring carbon atom and contains 1–20 carbon atoms, or another substituted styrene such as alpha-methylstyrene; or a non-hydrocarbon, e.g., an ester of acrylic or methacrylic acid optionally containing ether, hydroxy or amine functionality such as n-hexyl acrylate, cyclohexyl acrylate, 2-heptyl acrylate, 2-ethylhexyl acrylate, isobornyl acrylate, hexadecyl acrylate, lauryl methacrylate, n-tetradecyl methacrylate, 2-(ethoxyethoxy) ethyl acrylate, 2-ethoxyethyl acrylate, or methacryloxyisopropyl acid phthalate; a vinyl ether optionally containing hydroxy or amine functionality such as ethyl vinyl ether, propyl vinyl ether, isobutyl vinyl ether, tert-butyl vinyl ether, tert-amyl vinyl ether, n-octadecyl vinyl ether, cyclohexyl vinyl ether, ethylene glycol monovinyl ether, butanediol monovinyl ether, hexanediol monovinyl ether, ethylene glycol butyl vinyl ether, diethylene glycol monovinyl ether, triethylene glycol methyl vinyl ether, cyclohexanedimethanol monovinyl ether, aminopropyl vinyl ether, or 2-diethylaminoethyl vinyl ether; a vinyl ester such as vinyl acetate or vinyl stearate; or a nitrogen containing monofunctional monomers such as vinyl pyrrolidone or vinyl pyridine. The comonomer may be used in an amount, for example, of about 1 to 50 wt. % (broadest practicable range), preferably about 1 to 25 wt. % (narrower preferred range) based on the weight of total monomer. In any specific polymerization utilizing a comonomer, the identity and amount of the comonomer should be such that the resulting copolymer is soluble in the base stock oil utilized as the polymerization solvent.

The multiethylenically unsaturated, i.e., multifunctional cross-linking agent may also be hydrocarbon or non-hydrocarbon. Hydrocarbon multifunctional cross-linking agents which may be used are, for example, 1.2-divinylbenzene, 1,3-divinylbenzene, 1,4-divinylbenzene, 1,2,4-trivinylbenzene, 1,3-divinylnaphthalene, 1,8-divinylnaphthalene, 1,2-diisopropenylbenzene, 1,3-diisopropenylbenzene, 1,4-diisopropenylbenzene, 1,3,5-trivinylnaphthalene, 2,4-divinylbiphenyl, 3,5,4'-trivinylbiphenyl, 1,2-divinyl-3,4-dimethylbenzene, 1,5,6-trivinyl-3,7-diethylnaphthalene, 1,3-divinyl-4,5,8-tributylnaphthalene, and 2,2'-divinyl-4-ethyl-4'-propylbiphenyl. Divinylbenzene, in either its ortho, meta or paro isomer or mixtures thereof is preferred as the multifunctional cross-linking agent.

Non-hydrocarbon, multifunctional cross-linking agents which may be used are, for example, multiacrylic or methacrylic esters of polyhydric alcohols, e.g., tetraetheylene glycol diacrylate (TTEGDA), pentaerythritol tetraacrylate, and dipentaerythritol, monohydropentacrylate, multi-vinylethers of polyols, e.g. butanediol divinyl ether, hexanediol divinyl ether, ethyleneglycol divinyl ether, cyclohexanedimethanol divinyl ether, poly-THF-divinyl ether, tetramethylene glycol divinyl ether and tetramethyolpropane trivinyl ether; and multi-vinyl esters of polybasic acids, e.g., divinyl adipate, divinyl azelate, and divinyl sebacate.

The multifunctional cross-linking agent is present in an amount sufficient to bring about a degree of branching of the polymer so as to significantly raise its relative thickening power (RTP) in a functional fluid subsequently prepared from the polymer concentrate without however causing such a large degree of cross-linking that the polymer becomes substantially insoluble in the base stock oil of the concentrate at the desired concentration. Such amount of cross-linking agent may be in the range, for example, of about 0.01 to 5 mol %, preferably about 0.1 to 0.5 mol % based on the moles of total monofunctional monomer utilized. As explained more fully hereinafter, the presence of a chain transfer agent such as n-dodecylmercaptan (n-DDM) allows for the use of a larger amount of cross-linking agent, e.g., divinylbenzene (DVB), without causing insolubility than would be possible in the absence of such chain transfer agent.

The functional fluids having improved viscosity indexes and relative thicknesses intended to be produced by the process of this invention are, for example, lubricating oils and greases, brake fluids, transmission fluids, and hydraulic fluids. Thus, the base stock oils which can be used as the polymerization medium in the preparation of the polymer concentrate as well as those subsequently added to the concentrate to produce the final functional fluid, are oils conventionally utilized as significant components of such functional fluids;

Advantageously, the polymerization, particularly when the resulting polymer is a hydrocarbon, may be carried out in a medium comprising a base stock oil which is a liquid hydrocarbon oil in the form of either a mineral oil or a synthetic oil, suitable as a component of a functional fluid or the base stock for a grease in which any of the aforementioned oils are employed as a vehicle. In general, base mineral or synthetic oils employed as the polymerization medium and the diluting solvent in the preparation of the polymer concentrate or as the additional base stock oil for the preparation of a functional fluid, or grease vehicle, may be of any viscosity range suitable for the end use of the final functional fluid, as, for example, from about 2 to about 100 centistokes (cSt) and, preferably from about 4 to about 10 cSt at 100° C.

These oils may have viscosity indexes ranging, for example, from about 70 to about 100 using mineral oil base stocks and from about 100 to 200 using synthetic base stocks. The average molecular weights of these oils may range from about 250 to about 2,000. Where the resulting fluid is to be employed in the form of a grease, the base stock oil utilized in the polymerization and subsequently added is generally employed in an amount sufficient to balance the total grease composition, after accounting for the desired quantity of the highly branched polymer produced by the process of the invention, and other additive components to be included in the grease formulation.

In instances of functional fluids where synthetic oils, or synthetic oils employed as a vehicle for a grease, are desired in preference to mineral oils or in combination therewith, various compounds of this type may be successfully utilized as the polymerization medium in the production of the polymer concentrate and/or as the added base stock oil in the preparation of the final functional fluid. Typical synthetic vehicles include poly(alpha-olefins) (PAO's) such as polybutenes, polyhexenes, and polydecenes, polypropylene glycol, esters such as trimethylol propane esters, neopentylglycol esters, pentaerythritol esters, sebacates, adipates, and phthalates, alkylated diphenyl ethers and alkylated aromatics.

The polymerization process of this invention is carried out in the presence of a free radical initiator, e.g., a peroxy or azo compound. Particularly suitable initiators are t-butyl peroxide (t-BP), t-butyl peroxybenzoate, 1,1-di(t-butylperoxy)-3,3,5-trimethylcyclohexane sold under the trademark "Lupersol 231,", and dicumyl peroxide, with t-BP being the preferred initiator. The free radical initiator may be used in an amount, for example, in the range of about 0.001 to 1 mole per gram of total monomer.

Advantageously, as mentioned previously, a chain transfer agent is also present during the polymerization. Chain transfer agents which may be used are n-dodecylmercaptan (n-DDM), i.e., 1-dodecanethiol, which is preferred, ethanethiol, 1-butanethiol, 2-propanethiol, 2-methyl-2-propanethiol, 1-heptanethiol, 1-hexanethiol, 1-pentanethiol, 1-naphthalenethiol, 2-napthalenethiol, 1-octadecanethiol, 1-octanethiol, 2-octanethiol, 2-toluenethiol, p-toluenethiol, 1-tetradecanethiol, and 1-naphthalenemethanethiol.

The presence of a chain transfer agent during polymerization has the effect of moderating the cross-linking effect of the multifunctional cross-linking agent so that a larger amount of such cross-linking agent can be used to increase the branching of the polymer without causing gelling than would be possible in the absence of the chain transfer agent. The chain transfer agent may be used in an amount, for example, of about 0.025 to 0.5 mol % based on the moles of total monofunctional monomer.

The polymerization reaction is generally carried out at a temperature, for example, of about 50° to 200° C., preferably about 100° to 150° C., until monomer conversion is completed. The reaction time is often in the range, for example, of about 4 to 24 hours. The process may be carried out for example, as a batch process wherein a mixture of the entire amount of monofunctional monomer, multifunctional cross-linking agent, chain transfer agent, and base stock oil is heated to polymerization temperature and the free radical initiator is injected into the reactor substantially all at once to begin the polymerization, or wherein some of the base stock oil is added gradually or piecemeal during the polymerization. Such a batch process is preferred under most conditions.

The highly branched polymer dissolved in the base stock oil which is produced as a result of the process of this invention has a molecular structure of the type which is schematically represented in the drawing. Such polymer has a weight average molecular weight (Mw) of, for example, about 100,000 to 2,000,000, preferably about 200,000 to 1,000,000; a number average molecular weight (Mn) of, for example, about 50,000 to 1,000,000, preferably about 100,000 to 500,000; and a molecular weight distribution (MWD, Mw/Mn) of about 2.00 to 9.00, preferably about 2.0 to 5.0, as determined by gel permeation chromatography (GPC).

At the termination of the polymerization, the highly branched polymer may be present in the resulting polymer concentrate in an amount, for example, of about 15 to 67 wt. %, preferably about 25 to 50 wt. %. However, these concentrations of the high RTP polymers of this invention result in solutions which are often too viscous to be used directly as concentrates suitable for adding to a base stock oil in the preparation of a functional fluid. Thus the polymerization solution may optionally be diluted with the same oil as that utilized in the polymerization to substantially lower the concentration of a polymer, e.g., to 5–25 wt. %, resulting in a less viscous, more easily handled concentrate which may then be mixed with a base stock oil in the formulation of a functional fluid.

As stated, the final functional fluid product is obtained by mixing the polymer concentrate with an additional amount of base stock oil which may be the same or different from the base stock oil in the concentrate. Such functional fluid, e.g., lubricating oil, may contain the highly branched polymer in an amount, for example, of about 0.1 to 20 wt. %, preferably about 0.5 to 5 wt. %. In general, the presence in the base stock oil of the highly branched polymer of this invention has the effect of raising the viscosity index (VI) of such total base stock oil by an increment in the range, for example, of about 50 to 160 such that the final oil blend has a VI in the range, for example, of about 150 to 350, preferably about 175 to 250, (the VI being determined by the method of ASTM D2270) using kinematic viscosities in centistokes (cSt) determined at 40° C. and 100° C. Such kinematic viscosities of the polymer-containing functional fluid may be, for example, about 50 to 2,000 cSt. at 40° C. and about 8 to 100 cSt. at 100° C. In addition, certain of the highly branched polymers of this invention have a relative thickening power (RTP) of, for example, about 2 to 100, preferably about 3 to 20, where RTP is a measure of the thickening efficiency of the polymer relative to the amount of PAO-100 required to thicken the base oil to the same viscosity as the blend containing the polymer and is calculated by means of the following equation:

$$\log KV_{100}(\text{blend}) = \frac{x}{100} [2 - \log KV_{100} \text{ of base oil}] + \log KV_{100} \text{ of base oil}$$

where x is the percentage of PAO-100 required to achieve the blend viscosity, PAO-100 being a hydrogenated polydecene-1 having a $KV_{100}$ of 100 cSt. The RTP of the polymer is then determined by the equation:

RTP=x/(weight percent of polymer in blend)

The invention is further illustrated by the following examples.

Examples 1–4 and Comparative Example A

To a 500 ml, 4-necked round-bottom flask equipped with thermometer, nitrogen inlet, nitrogen outlet, and stirrer were charged 75 grams of weight of p-tert-butylstyrene (t-BS), 75 grams of a petroleum distillate base stock mineral oil (Stock 142) having a kinematic viscosity at 40° C. ($KV_{40}$) of 22.2 centistokes (cSt) and at 100° C. ($KV_{100}$) of 4.3 cSt, and a viscosity index (VI) of 101 (ASTM D2270), and varying amounts of divinylbenzene (DVB) added as a composition containing 55 wt. % of DVB meta and para isomers and 43 wt. % ethylvinyl benzene meta and para isomers, with the meta:para ratio of both compounds being 2.3, and the remainder of the composition being diethylbenzene and naphthalene. The t-BS and DVB had been previously dried and purified by passing it through an aluminum oxide column to remove the inhibitors.

The mixture was stirred and dry nitrogen was bubbled through it for 30 minutes. After the reactor was heated to 145°–150° C., 1.12 gram (0.75 mmol) of t-butyl peroxide (t-BP, 98% purity) was injected into the reactor to initiate the polymerization reaction. The temperature of reaction was maintained for six hours during which time the viscosity of the mixture gradually increased. After the mixture was cooled down to room temperature, the polymer solution was diluted by adding additional Stock 142 base stock oil until the polymer concentration of the solution was 5 wt. %, a more conventional concentration for measurement of viscometric properties.

Table I shows the amount of DVB added in Examples 1–4 as mol % based on the moles of t-BS present, with no DVB having been added in Comparative Example A, the kinematic viscosities at 40° C. ($KV_{40}$) and 100° C. ($KV_{100}$), the viscosity index (VI) of the 5 wt. % polymer solution, and the relative thickening power (RTP) of the polymer.

TABLE I

| Example | DVB, mol % | $KV_{40}$ cSt. | $KV_{100}$ cSt. | VI | RTP |
|---|---|---|---|---|---|
| A | 0 | 48.3 | 8.5 | 151 | 4.3 |
| 1 | 0.1 | 53.9 | 9.7 | 168 | 5.2 |
| 2 | 0.2 | 63.3 | 11.2 | 171 | 6.1 |
| 3 | 0.3 | 74.2 | 13.3 | 183 | 7.2 |
| 4 | 0.4 | 97.3 | 17.6 | 200 | 9.0 |

A comparison of the results of Examples 1–4 with those of Comparative Example A shown in Table I indicate the advantages in terms of raising the VI of the functional fluid and the RTP of the polymer gained by using a highly branched rather than a straight chain polymer of t-BS.

Example 5

The procedure of Example 1–4 was generally followed except that the polymerization solution contained 15 wt. % solids and 0.5 mol % of DVB was utilized. After filtering out some small gel particles and diluting to 5 wt. % of solids with additional Stock 142 base stock oil, the mixture had a $KV_{40}$ of 123.4 cSt., a $KV_{100}$ of 38.6 cSt. and a VI of 339, and the RTP of the polymer was calculated to be 14.1. These results indicate that in the absence of a chain transfer agent, the use of 0.5 mol % of DVB may cause some gel formation.

Examples 6 and 7

The procedure of Example 1 was generally followed except that 0.5 mol % DVB and 0.05 mol % of n-dodecylmercaptan (n-DDM) based on the moles of t-BS were added to the base stock oil with the t-BS and two different amounts of t-butyl peroxybenzoate were utilized as the indicator in place of the t-BP. The results are shown in Table II.

TABLE II

| Example | Initiator, mmol/g | $KV_{40}$, cSt. | $KV_{100}$, cSt. | VI | RTP |
|---|---|---|---|---|---|
| 6 | 0.01 | 35.1 | 6.93 | 162 | 3.04 |
| 7 | 0.0025 | 55.6 | 10.7 | 187 | 5.81 |

The results of Table II indicate that polymerization can be carried out using 0.5 mol % of DVB without gel formation in the presence of a chain transfer agent such as n-dodecylmercaptan (n-DDM), and also that free radical polymerization initiators other than t-BP, e.g., t-butyl peroxybenzoate, may be used in the process of this invention to obtain improved thickness and VI of functional fluids, although in this case the improvement was not as pronounced as with t-BP.

Examples 8–10

The procedure of Examples 1–4 was generally followed using 0.35 mol % of DVB, except that in place of Stock 142, a synthetic lubricating oil base stock was used which was a polymerized alpha-olefin (PAO-4), more specifically a hydrogenated polymer of decene-1 having a kinematic viscosity at 40° C. ($KV_{40}$) of 17.5 cSt and at 100° C. ($KV_{100}$) of 4.0 cSt and a viscosity index (VI) of 128 (ASTM $D_{2270}$); and subsequent to initiation of polymerization at 145° C., the solution was diluted to 25 wt. % from 50 wt. % by adding more PAO-4. In Example 8, all the additional PAO-4 was added at once after the termination of 6 hours of polymerization at 145° C.; in Example 9, the additional PAO-4 was gradually added after 1 hour of polymerization at 145° C. to achieve the dilution to 25 wt. % of solids, after which polymerization was continued for 6 additional hours; and in Example 10, the additional PAO-4 was gradually added after 2 hours of polymerization at 145° C. to achieve the dilution to 25 wt. % of solids, after which the polymerization was continued for 6 additional hours. After the conclusion of the polymerizations, the 25% solutions were diluted to 5 wt. % solids by addition of PAO-4 base stock oil, and yielded the following comparative viscometric data:

TABLE III

| Example | $KV_{40}$, cSt. | $KV_{100}$, cSt. | VI | RTP |
|---|---|---|---|---|
| 8 | 112.5 | 27.4 | 280 | 12.0 |
| 9 | 89.6 | 32.8 | 292 | 13.1 |
| 10 | 66.5 | 35.1 | 299 | 13.5 |

Examples 11–13

The procedure of Examples 1–4 was generally followed using PAO-4 as the base stock oil and varying quantities of DVB and n-DBB. The PAO-4 was used as the base stock oil both as the solvent for the polymerization in preparing the concentrate and as the additional base stock oil added to dilute the polymer concentrate for the purpose of measuring viscometric properties. The amounts of DVB and n-DDM utilized in each example as well as the viscometric properties of the 5 wt. % solution of the polymer in the oil, are shown in Table IV.

TABLE IV

| Example | DVB mol % | n-DDM mol % | KV$_{40}$ cSt. | KV$_{100}$ cSt. | VI |
|---|---|---|---|---|---|
| 11 | 0.4 | 0.05 | 79.6 | 18.2 | 250 |
| 12 | 0.5 | 0.05 | 85.8 | 20.7 | 267 |
| 13 | 0.5 | 0.10 | 91.4 | 22.6 | 282 |

The results of Table IV indicate that the process of this invention can be used to improve the viscometric properties of synthetic oils such as PAO-4 as well as petroleum distillate mineral oils such as Stock 142, and also that 0.5 mol % of DVB can be employed without gel formation in the presence of a chain transfer agent.

Examples 14 and Comparative Example B

The procedure of Examples 1–4 and Comparative Example A was generally followed except that PAO-4 was used as the base stock oil polymerization solvent in place of Stock 142 mineral oil, the polymerization was carried out with a concentration of 25 wt. % of t-BS rather than 50 wt. %, no multifunctional cross-linking agent was employed in Comparative Example B and 0.1 mol % of dipentaerythritol monohydropentacrylate (SR-399) based on the t-BS was utilized in place of DVB as a multifunctional cross-linking agent in Example 14. After 6 hours of polymerization and further dilution of the mixtures to 5 wt. % of polymer by addition of PAO-4, the mixtures had the properties shown in Table V. These results indicate that cross-linking agents other than DVB, e.g., SR-399, can be used to prepare a solution of a highly branched polymer of t-BS in a base stock oil to improve the viscometric properties of the oil to a greater extent than the improvement obtained with a straight chain polymer of t-BS.

TABLE V

| Example | SR-399 mol % | KV$_{40}$ cSt. | KV$_{100}$ cSt. | VI | RTP |
|---|---|---|---|---|---|
| 14 | 0.1 | 70.4 | 16.3 | 248 | 8.7 |
| B | 0 | 47.4 | 10.0 | 206 | 5 |

We claim:

1. A process for the preparing a polymer concentrate which is a relatively concentrated solution in a base stock oil of a highly branched polymer containing segments of p-tert-butylstyrene (t-BS), comprising polymerizing in the presence of a free radical polymerization initiator, a monoethylenically unsaturated (monofunctional) monomer including t-BS and about 0.01 to 0.5 mol % based on the total monofunctional monomer utilized, of a multiethylenically unsaturated (multifunctional) cross-linking agent dissolved in said base stock oil.

2. The process of claim 1 wherein the polymer solution obtained from the polymerization is diluted with an additional amount of said base stock oil to obtain a polymer concentrate having a lower polymer concentration and viscosity than said polymer solution.

3. The process of claim 1 wherein said monofunctional monomer consists of t-BS.

4. The process of claim 1 wherein said multifunctional cross-linking agent is divinylbenzene (DVB).

5. The process of claim 4 wherein said amount of DVB is in the range of about 0.1 to 0.5 mol % based on the moles of monofunctional monomer.

6. The process of claim 1 wherein said initiator is t-butyl peroxide ( t-BP ).

7. The process of claim 1 wherein said base stock oil is a hydrocarbon oil.

8. The process of claim 7 wherein said hydrocarbon oil is a petroleum distillate mineral oil.

9. The process of claim 7 wherein said hydrocarbon oil is a poly (alpha-olefin) synthetic oil.

10. The process of claim 1 wherein said polymerization is carried out at a temperature of about 50° to 200° C.

11. A polymer concentrate prepared by the process of claim 9 wherein said range of cross-linking agent is about 0.3 to 0.5 mol %.

12. A polymer concentrate prepared by the process of claim 1 wherein said range of cross-linking agent is about 0.3 to 0.5 mol %.

13. A poller concentrate prepared by the process of claim 2 wherein said range of cross-linking agent is about 0.3 to 0.5 mol %.

14. A polymer concentrate prepared by the process of claim 3 wherein said range of cross-linking agent is about 0.3 to 0.5 mol %.

15. A polymer concentrate prepared by the process of claim 4 wherein said range of DVB is about 0.3 to 0.5 mol %.

16. A polymer concentrate prepared by the process of claim 7 wherein said range of cross-linking agent is about 0.3 to 0.5 mol %.

17. A polymer concentrate prepared by the process of claim 8 wherein said range of cross-linking agent is about 0.3 to 0.5 mol %.

18. A functional fluid composition prepared by mixing the polymer concentrate of claim 17 with a base stock oil which is the same or different from the base stock oil present in the polymer concentrate.

19. A functional fluid composition prepared by mixing the polymer concentrate of claim 13 with a base stock oil which is the same or different from the base stock oil present in the polymer concentrate.

20. A functional fluid composition prepared by mixing the polymer concentrate of claim 14 with a base stock oil which is the same or different from the base stock oil present in the polymer concentrate.

21. A functional fluid composition prepared by mixing the polymer concentrate of claim 15 with a base stock oil which is the same or different from the base stock oil present in the polymer concentrate.

22. A functional fluid composition prepared by mixing the polymer concentrate of claim 16 with a base stock oil which is the same or different from the base stock oil present in the polymer concentrate.

23. A functional fluid composition prepared by mixing the polymer concentrate of claim 17 with a base stock oil which is the same or different from the base stock oil present in the polymer concentrate.

24. A functional fluid composition prepared by mixing the polymer concentrate of claim 11 with a base stock oil which is the same or different from the base stock oil present in the polymer concentrate.

25. The functional fluid composition of claim 18 being a lubricating composition wherein said base stock oil is a hydrocarbon lubricating base stock oil, and said highly branched polymer consists of t-BS homopolymer segments linked by DVB.

26. The functional fluid composition of claim 18 containing about 0.1 to 20 wt. % of said polymer.

27. A process for preparing a polymer concentrate which is a relatively concentrated solution in a base stock oil of a highly branched polymer containing segments of p-tert-butylstyrene (t-BS), comprising polymerizing in the presence of a free radical polymerization initiator and a chain transfer agent, a monoethylenically unsaturated (monofunctional) monomer including t-BS and about 0.01 to 5.0 mol % based on the total monofunctional monomer utilized, of a multiethylenically unsaturated (multifunctional) cross-linking agent dissolved in said base stock oil.

28. A polymer concentrate prepared by the process of claim 27 wherein said range of cross-linking agent is about 0.3 to 0.5 mol %.

29. The polymer concentrate of claim 35 wherein said chain transfer agent is n-dodecyl mercaptan (n-DDM).

30. A functional fluid composition prepared by mixing the polymer concentrate of claim 35 with a base stock oil which is the same or different from the base stock oil present in the polymer concentrate.

31. The composition of claim 30 wherein said chain transfer agent is n-dodecyl mercaptan (n-DDM).

32. The process of claim 27 wherein said chain transfer agent is n-dodecyl mercaptan (n-DDM).

33. The process of claim 27 wherein said chain transfer agent is present in an amount of about 0.025 to 0.5 mol % based on the moles of monofunctional monomer.

* * * * *